United States Patent [19]
Koulicovitch et al.

[11] 3,819,274
[45] June 25, 1974

[54] METHOD OF READING AND INTERPOLATION FOR A PRECISION RULE AND APPARATUS FOR CARRYING IT OUT

[75] Inventors: Maurice Koulicovitch, Geneva; Jean Georgiou, Grand-Lany, both of Switzerland

[73] Assignee: Societe Genevoise D'Instruments De Physique, Geneva, Switzerland

[22] Filed: Feb. 5, 1973

[21] Appl. No.: 329,318

[30] Foreign Application Priority Data
Feb. 22, 1972 Switzerland.......................... 2530/72
Nov. 6, 1972 Switzerland........................ 16112/72

[52] U.S. Cl. ................................. 356/170, 356/106
[51] Int. Cl. ............................................. G01b 11/04
[58] Field of Search ......................... 356/106–113, 356/169, 170

[56] References Cited
UNITED STATES PATENTS
2,848,921  8/1958  Koulikovitch................... 356/106 R
3,043,182  7/1962  Saunders............................ 356/110
3,285,124  11/1966  Lovins ............................... 356/110
3,572,937  3/1971  Baldwin ............................. 356/110

OTHER PUBLICATIONS
J. Strong, Concepts of Classical Optics, App. C "Kösters Double image Prism" J. B. Saunders pp. 393–399 (1958).

Primary Examiner—John K. Corbin
Assistant Examiner—Paul K. Godwin
Attorney, Agent, or Firm—Young & Thompson

[57] ABSTRACT

The invention concerns a method of reading and interpolation for a precision rule wherein the spaces in the rule are compared with an interference pattern having a maximim pitch equal to the graduation of the rule, said method comprising the creation of a grating of interference fringes of equal thicknesses in the plane of the rule by the intersection of two beams of monochromatic light emanating from the same source and converging on the plane of the rule. The pitch of the fringes is set by the choice of the wave-length of the light and by the angle subtended by the axes of the said beams.

The invention concerns further an arrangement which comprises a Kösters prism, the semitransparent interface of which is disposed perpendicularly to the rule, a monochromatic light source illuminating one of the lateral faces of the prism and at least one photo-electric cell receiving the rays reflected by the rule.

2 Claims, 4 Drawing Figures

METHOD OF READING AND INTERPOLATION FOR A PRECISION RULE AND APPARATUS FOR CARRYING IT OUT

The two classical instruments of metrology, the rule and the interferometer, each have well known defects which make their use sometimes problematical and sometimes impossible.

Briefly, an interferometer (Michelson, Kösters, etc.) subdivides a displacement into fractions of wave-lengths. But these fractions of wave-lengths (the "fringes") are never exact multiples of the measuring system employed. The fring variations have to be converted (e.g. into microns), which is a troublesome complication. There are more serious disadvantages. The variations in wave-lengths emanating from a source (generally an He Ne laser) are brought about not only by the instability of the laser frequency, which then has to be stabilised, a costly process, but also and above all by the continuous changes in the index of refraction of the air. Many solutions have been proposed to avoid these drawbacks but experience shows that the use of interferometers for measuring a displacement is still impracticable for industrial purposes.

The conventional rule, i.e. the rule divided by fine lines located at regular intervals, has one omission. The intermediate positions between two lines have to be interpolated.

Many solutions have been proposed to resolve this problem but they are often either slow or complicated or imprecise.

A problem which confronts manufacturers of high precision machines is how to determine the position of a movable member, at least wiith a precision of ± 1 micron for finishing machines and ± 0.1 micron for measuring machines. The solutions proposed or brought into being can be divided into the following main categories:

a. luminous interferences. Their sensitivity to the environment makes them useless outside the laboratory.

b. Graduated rules (e.g. with 10 micron lines every mm) require a very fine interpolator; its action is precise but slow if the reading is taken by optical scanning, and if the rule is electric (e.g. the Ferrand inductosyn) very fine interpolation becomes problematic.

c. Finely divided rules which we shall call gratings. The advantage of gratings is that they require less fine interpolation to determine a precise position. Ideally there should be no interpolation at all, which would mean that the pitch of the grating would have to be 2 microns for finishing machines and 0.2 micron for measuring machines. Such fine divisions cannot be obtained by the normal methods.

The object of the invention is to propose a system which is both precise enough to satisfy the needs of machine manufacturers and simple enough to be practicable.

The invention concerns a method of reading and interpolation for a precision rule wherein the spaces in the rule are compared with an interference pattern having a maximum pitch equal to the graduation of the rule, characterised in that a pattern of fringes of equal thicknesses is created in the plane of the rule by the intersection of two beams of monochromatic light emanating from the same source and converging on the plane of the rule, and in that the pitch of the fringes is set by the choice of the wave-length of the light and by the angle subtended by the axes of the said beams.

The invention also concerns an arrangement for carrying out the method, characterised in that it comprises a Kösters prism, the semi-transparent interface of which is disposed perpendicularly to the rule, a monochromatic light source illuminating one of the lateral faces of the prism and at least one photo-electric cell receiving the rays reflected by the rule.

The principle underlying the present method and a means for carrying it out are illustrated diagrammatically and by way of example in the accompanying drawings, in which.

Figure 1:
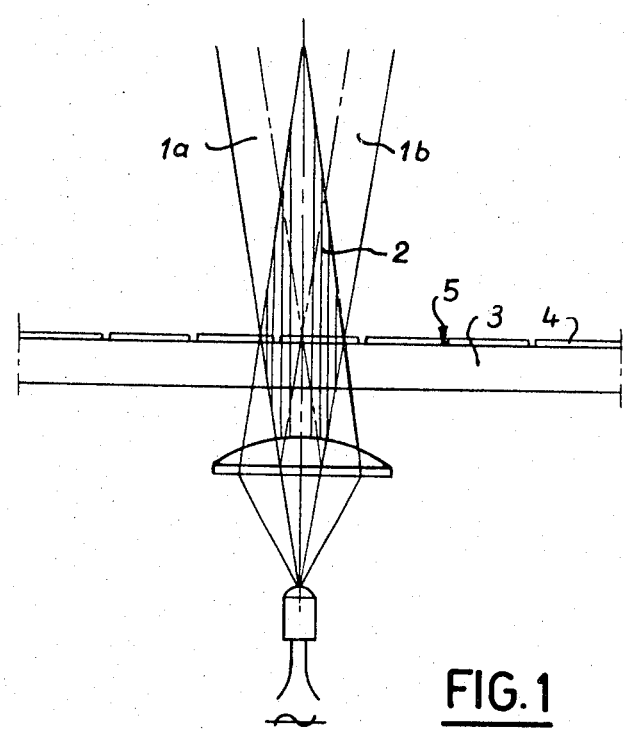
FIG. 1 illustrates the principle on which the measuring process is based.

To gain a clear understanding of the principle on which the invention is based, one should imagine a rule made of metallised glass and divided e.g. into mm or fractions of a mm so as to obtain narrow transparent regions; this is quite conventional and can be obtained on an ordinary graduating machine.

The interpolator comprises a small interferometer placed perpendicularly to the plane of the rule and adjusted so as to create in space a field of fringes of equal thickness the (adjustable) pitch of which is the desired submultiple of a graduation of the rule.

On observing the fringes of equal thickness through the graduations of the rule one can, by displacing the rule longitudinally, see a series of coincidences between the transparent lines and the alternately light and dark regions of the fringes of equal thickness.

A photo-electric cell picking up the light which is thus modulated in space and which passes through the rule will transmit a current modulated in time when the rule is displaced.

It is clear that if there are, for example, 100 fringes of equal thickness between two lines on the rule there will be 100 illuminations and extinctions when the rule is displaced by the length of one of its graduations.

The operating conditions are as follows:

The graduated plane of the rule must be displaced within the space containing the fringes of equal thickness.

The maximum width of the lines on the rule must be equal to half the pitch of the fringes. For example, 100 fringes between two millimeter lines would mean that the maximum width of the lines would be 5 microns.

The following features of this arrangement should be emphasized:

1. To create fringes of equal thickness it is sufficient to make two beams emanating from the same source intersect at an angle which will depend on the pitch chosen. The line bisecting this angle will be substantially perpendicular to the plane of the rule.

2. The fringes are present throughout the region where the beams intersect. They are planes which are parallel with one another and with the line bisecting the beams if the beams are cylindrical.

In this case the position along the bisector is immaterial. There is therefore no optical focusing to be done as in the case of a lens forming an image.

If the beams are two identical cones, the beams will be convergent planes, which will vary the pitch of the fringe according to the position of the intercepting shutting out plane. In this case one can thus modify the interpolation pitch finely by displacing the interferometer relative to the rule, without prejudice to the adjustment of the angles of the beams. The pitch is (theoretically) adjustable between infinite (dull colour, parallel beams) and the wave-length of the light used (antiparallel beam), which is an angular variation of 0° to 180°.

But it is obvious that in practice there is then no point in having wide fringes and no possibility of examining fringes which emanate from two opposed beams and become parallel with the rule. With an angle of around 18° between the two beams (for $\lambda = 0.628$ micron) a deep region is obtained where the fringes are spaced by 2 microns; this enables pitches of 1 micron to be counted with a counting device which is fed by the cell coupled to a symmetrical amplifier (the lines on the rule must have a maximum width of 1 micron).

The lines on the rule may be spaced either by a minimum distance equal to the pitch of the fringes or by a maximum distance which is an exact multiple of the interfringe spacing but no longer than the diameter of the region where the two beams intersect, the purpose being to ensure continuity of counting. If counting is to take place in both directions there must be two modulations de-phased by a quarter of a fringe; this can be done, for example, by using two de-phased groups. The modulation produced by the displacement is sinusoidal, thus enabling an additional interpolation to be obtained inside a fringe by electronic means.

By inclining the fringes of equal thickness to the rule one can create moire fringes which, on coinciding themselves with a reticule, make it possible to obtain an interpolation which is finer than the interfringe spacing of equal thickness. Coincidence between a rule comprising very fine divisions like a grating having a period equal to the spacing of the fringes of equal thickness and the latter would give a better average value, because of the averaging effect of the great number of coincidences, and a better light yield, than would be possible if the rule were conventionally divided by spaces much wider than the fine lines; this applies both to parallel coincidence and to moire fringes. All that is necessary to obtain fringes of equal thickness in space is, for example, to use a Kösters prism and to incline the incoming ray so that the two outgoing rays intersect at the desired angle. This is thus a simple step which does not require any complex optical apparatus.

Local l formation of fringes gives a pattern which is sinusoidal, clear and with good contrast. All the light is used and the depth of field is considerable, e.g. as compared with a divided reticule which, if projected by an optical reducing device, would give a non-plane, deformed image with little contrast. Similarly, it is virtually impossible to bring a reticule divided every 2 microns close enough to a rule to prevent the light from diffusing, without touching the rule. The fringes of equal thickness are relatively straight, equidistant and parallel only if the wave front is plane and the elements of the interferometer are flat.

If it is stipulated that the spacings should be well enough defined for them still to be interpolated to the nearest 1/10, this means that the planeness of the wave fronts must be better than 1/10 fringe, which corresponds to a good standard optical device. Consequently, interpolation by interference in a rule divided, for example, every 100 microns and having lines of 1 micron, with a region of fringes spaced by 2 microns, gives numerical interpolation every micron with a half fringe optical plane. If on the other hand the aim is to interpolate, either by moire fringes with a secondary reticule or electronically at 1/10 micron, then the planeness of the optical device on the surface used must be 1/20 fringe, which is perfectly reasonable. Since the moire fringes are themselves spaced by, for example, 200 microns it is easy to superimpose them on a reticule not too close to the rule or even to form an image of them with a standard lens.

The pitch of the fringes of equal thickness is conditioned by the angle of the interfering beams and by the wave-length which changes spontaneously, either by frequency fluctuations in the laser or by variation of the index of the air.

All that has been proposed for stabilizing longitudinal interferometers may obviously be applied to this "transverse" interferometer. But the fact that errors are accumulated only over the spacing of one graduation in the rule means — and this is an advantage of this arrangement — that errors due to the causes mentioned above are virtually negligible.

If no precautions are taken to stabilise the laser and the air index, the wave-length could in fact have a relative variation of the order of $10^{-4}$. In the case of a conventional interferometer measuring one meter, this corresponds to an uncertain time error of $10^{-4}$ metre or 100 microns. In the case of a rule interpolated from mm to mm this corresponds to an uncertain error of $10^{-4}$ mm or 1/10 micron, or if the rule is subdivided into 1/10 mm, to an uncertain error of $0.1 \times 10^{-4}$ mm or 1/100 micron (whatever the total length of the rule) while if the rule is a grating of the same pitch as the fringes the uncertain error will be zero. Errors in graduating the rule are not uncertain in time and may be corrected from any memory, for example a correcting cam.

To summarize, the rule may be interpolated in a simple and precise manner without any unforeseeable fluctuations.

FIG. 1 illustrates the principle on which the method is based. 1a and 1b are two converging monochromatic beams which create fringes of equal thickness 2 in the region where the beams intersect. The rule 3 is transparent in this example and has an opaque layer 4 in which transparent slits 5 are formed. One or more of these slits is in the region of the fringes. If the slit or slits are centred on a bright fringe more light will pass than if they are centred on a dark fringe.

The distance between two slits must be less than the length covered by all the fringes so that there is no gap during displacement.

In a special application of the process a grating is used with, for example, a pitch of 2 microns, graduated on a reflecting metal rule. The possibility of obtaining such a grating by marking the surface through very high powered interference is described in another patent. The rule must usually be metallic so that its thermal expansion is close to that of the machine and parts which have to be machined or measured. The pitch of 2 microns is only an example but a typical one, for by counting the "blacks" and "whites" of the graduation one can obtain the pitch fineness of 1 micron, and because easy 1/10 interpolation enables a position to be determined to the nearest 0.1 micron. A pitch finer than 2 microns would be more tricky to obtain and a wider pitch would require more extensive and thus less reliable interpolation.

The grating is placed at the intersection of two coherent, monochromatic beams of continuous light. The beams intersect at an angle such that the fringes which are parallel in space have a pitch identical with the grating (for example 2 microns). It is clear that if the illuminated scores coincide with the reflective portions of the grating all the light will be thrown back. If the illuminated scores of the grating coincide with non-reflective portions the light will be diffused. Very intense modulation of the reflected light can thus be obtained (also of the transmitted light in the case of a rule with reflective and transparent portions). When there is movement of the rule relative to the region where the fringes are produced, the light fluctuates in accordance with a sinusoidal function on which a certain level of continuous light is superposed.

One or more quick action photo-electric cells make it possible to convert the light signals into electric signals and consequently to count the number of fluctuations during a displacement and to compensate for the continuous component. See FIG. 2.

The fact that the light (and electric) signals are sinusoidal greatly facilitates the possible interpolations which are conventionally obtained by combining two signals which are out of phase by a quarter of a pitch and emanating, for example, from two pick-ups out of phase by a quarter of a pitch. Interpolation is then a measure of the phase of the combined signal relative to one of the two original signals. Similarly, the existence of two trains of signals dephased by a quarter of a phase traditionally enables the passage of the signals to be counted and the direction of displacement to be taken into account.

Figure 2:
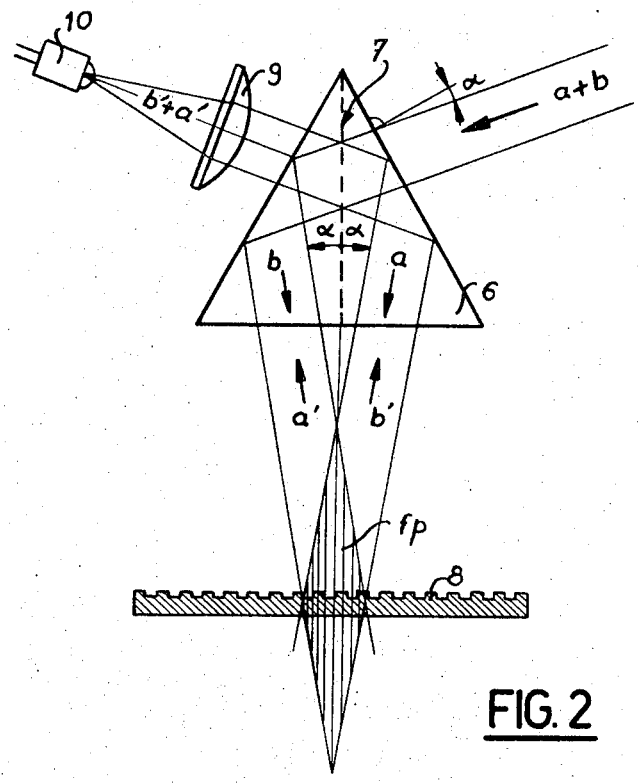
FIG. 2 illustrates an arrangement for carrying out the measuring process.

Referring now to FIG. 2, the arrangement comprises a Kösters prism 6, i.e. two prisms with a 30° apex and a semi-reflective layer 7.

The llight beam $a + b$ is parallel, coherent and monochromatic. It emanates typicalcally from an HeNe laser. It divides into two beams $a$ and $bb$ which, on intersecting, form a field of plane fringes $fp$, the pitch of which can be adjusted by varying the angle $a$.

The rule 8, which is a grating of the same spatial frequency as $fp$, either refelcts or fails to reflect the beams $a'$ and $b'$ according to its setting.

The beams $a'$ and $b'$ are brought together at the cell 10 after being condensed by the lens 9.

The interferences produced between the beams $a'$ and $b'$ are fixed and are not modulated by the displacement of the rule/grating 8. They have no effect on operation since the rule 8 is never flat enough to create a "dull colour" and to extinguish the illumination through the beams $a'$ and $b'$ cancelling each other out. One can always create a state of slight asymmetry in order to avoid this extreme case.

Figure 3:
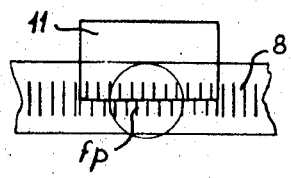
FIG. 3 is a detail from a modification of the FIG. 2 arrangement.

The arrangement has the following advantages:

a. The fringes produced are as fine as are required and still maintain good contrast. This is impossible if an image of an existing grating is formed by a spherical image-forming optical device. b. The region where the fringes exist is so extensive or "deep" that the position of the level of the rule is not in the least critical.

c. Recovery of the modulated beams takes place at the same side of the rule as illumination. The convenience is such that it is possible to ignore the beams passing through in the case of a reflective/transparent rule. It should be remembered that in practice the rules used in the majority of cases are opaque, reflective metal ones.

d. The arrangement is extremely simple and includes fewer components than other solutions proposed.

e. It is easy to create a region which is out of phase by the desired amount, by sliding a plane parallel glass 11 half way across the thickness of one or both beams. In this case the return beam $a' + b'$ will also be divided into two and, by a conventional method of separation with two deflecting mirrors (not shown) and two receiving cells, the two desired signals can be obtained for reversible counting or interpolation (FIG. 3).

Figure 4:
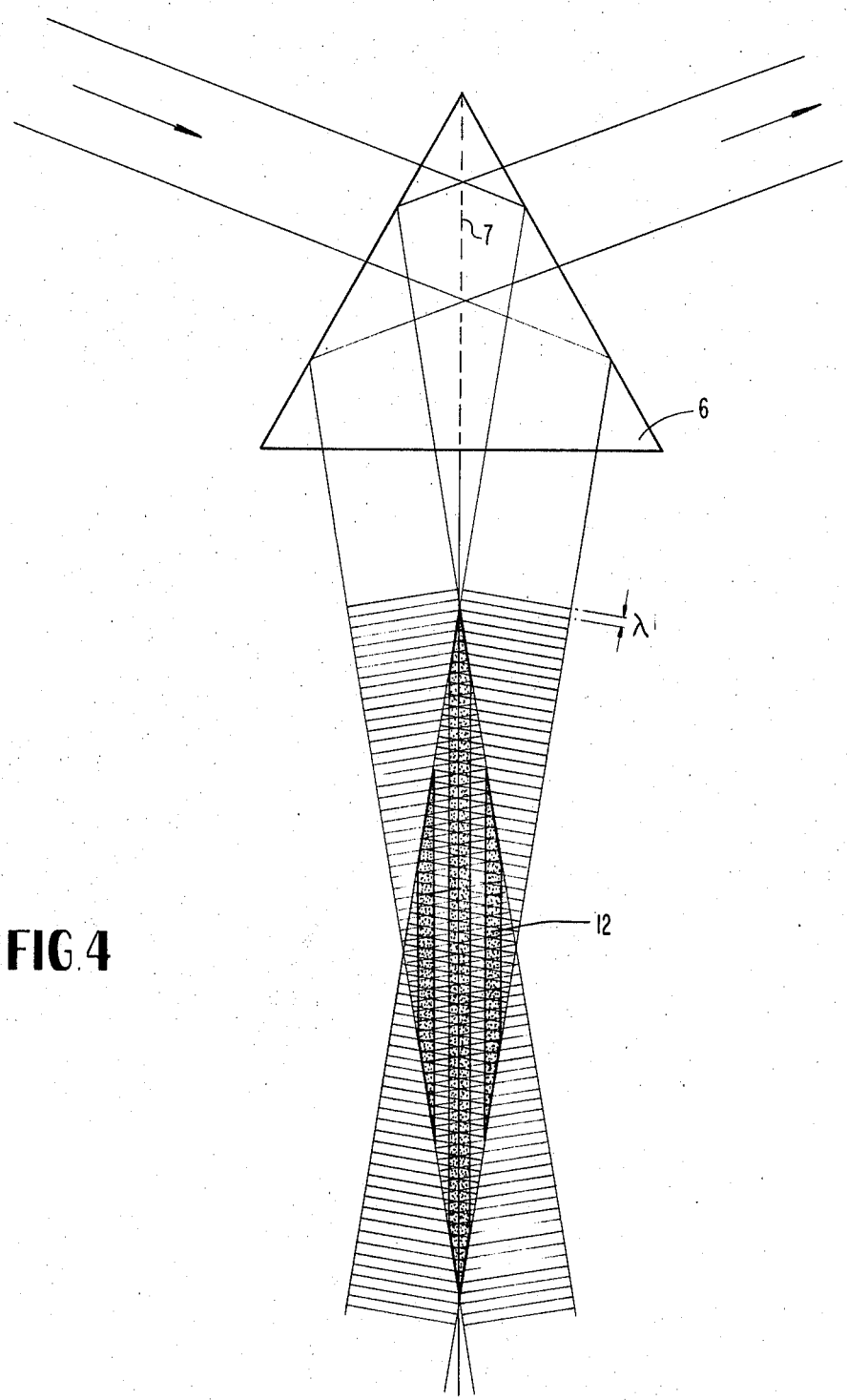
FIG. 4 shows the pattern in space of the interference fringes, with the grating removed.

FIG. 4 shows as darkened areas 12 the pattern in space of the fringes established by the interference of the portions of the beam of light of wavelength λ, and thus illustrates the depth of the field of the fringes in a direction perpendicular to the grating, referred to above.

What we claim is:

1. A method of reading a precision rule, comprising intersecting two beams of monochromatic light from a single source through a Kosters prism having a semi-reflective layer thereby to establish in space a deep field of interference fringes of a predetermined pitch, disposing in said field of interference fringes a rule comprising a flat ruled grating perpendicular to said layer having thereon a series of alternating reflective and non-reflective surface markings that are parallel to each other and to said layer and spaced with the same pitch as said fringes, and moving said grating in its plane perpendicular to said markings thereby to reflect back through said Kosters prism light whose intensity varies sinusoidally, and counting the modulations of the reflected light as a measure of the movement of said rule.

2. Apparatus for reading a precision rule, comprising a Kösters prism having a semi-reflective layer disposed in a first plane, a rule disposed and movable in a second plane perpendicular to said first plane, and having thereon alternating reflecting and non-reflecting surface markings that are parallel to each other and to said first plane, a monochromatic light source illuminating one of the faces of the prism at an angle such as to create interference fringes whose pitch is equal to the pitch of said markings of the rule, and a photo-electric cell receiving from said prism rays reflected by the rule.

* * * * *